US012320679B2

(12) United States Patent
Falk et al.

(10) Patent No.: US 12,320,679 B2
(45) Date of Patent: *Jun. 3, 2025

(54) SENSOR ASSEMBLY FOR A ROTARY SENSOR

(71) Applicant: Honeywell International Inc., Charlotte, NC (US)

(72) Inventors: James C. Falk, Charlotte, NC (US); Keith D. Larson, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,403

(22) Filed: Dec. 28, 2023

(65) Prior Publication Data

US 2024/0125625 A1    Apr. 18, 2024

Related U.S. Application Data

(63) Continuation of application No. 17/204,314, filed on Mar. 17, 2021, now Pat. No. 11,898,885.

(30) Foreign Application Priority Data

Mar. 24, 2020  (IN) .............................. 202011012802

(51) Int. Cl.
  *G01D 5/16*   (2006.01)
  *G01B 7/30*   (2006.01)

(52) U.S. Cl.
  CPC ....... *G01D 5/16* (2013.01); *G01B 7/30* (2013.01)

(58) Field of Classification Search
  CPC .. G01D 5/12–16; G01D 11/24; G01D 11/245; G01B 7/30
  See application file for complete search history.

(56) References Cited

U.S. PATENT DOCUMENTS 5,270,645 A * 12/1993 Wheeler ............... G01D 5/145
                                                        123/376
6,742,402 B1    6/2004 Volz et al.
(Continued)

FOREIGN PATENT DOCUMENTS

CH         357355 A      9/1961
CN        1271456 A     10/2000
(Continued)

OTHER PUBLICATIONS

U.S. Appl. No. 17/204,314, filed Mar. 17, 2021, 2021/0302203, Pending.
(Continued)

*Primary Examiner* — Huy Q Phan
*Assistant Examiner* — David B Frederiksen
(74) *Attorney, Agent, or Firm* — Alston & Bird LLP

(57) ABSTRACT

A sensor assembly for a rotary sensor is provided. The sensor assembly comprises a sensor housing, a sensor shield, and a sensor. The sensor housing defines a cavity. The sensor shield is disposed within the cavity of the sensor housing and defines a slot along a length of the sensor shield. The sensor shield is composed of a highly permeable material. The sensor is disposed within the cavity and at least a portion of the sensor is positioned within the slot of the sensor shield. The sensor comprises a printed circuit board having a plurality of sensor elements disposed along an inner circumference of the printed circuit board in a radially outward direction, and each sensor element is positioned at an equal distance from each other.

20 Claims, 10 Drawing Sheets

(56) References Cited

U.S. PATENT DOCUMENTS

| | | |
|---|---|---|
| 6,972,558 B1 | 12/2005 | Robinson |
| 7,176,386 B1 | 2/2007 | Aidam et al. |
| 7,375,511 B2 | 5/2008 | Kang |
| 10,488,225 B2 | 11/2019 | Ausserlechner |
| 2001/0009366 A1 | 7/2001 | Kono et al. |
| 2004/0017186 A1 | 1/2004 | Viola |
| 2004/0145365 A1* | 7/2004 | Lutaud ............... G01D 11/30 324/207.25 |
| 2006/0176050 A1 | 8/2006 | LaPlaca |
| 2007/0252591 A1 | 11/2007 | Babin |
| 2008/0101740 A1 | 5/2008 | Aoki et al. |
| 2009/0123098 A1 | 5/2009 | Takahashi |
| 2009/0161264 A1* | 6/2009 | Meyersweissflog ... G01D 5/147 360/324 |
| 2009/0295384 A1 | 12/2009 | Teppan |
| 2011/0127997 A1 | 6/2011 | Itomi |
| 2011/0133728 A1 | 6/2011 | Tokunaga |
| 2011/0254543 A1 | 10/2011 | Frachon et al. |
| 2013/0113470 A1 | 5/2013 | Kegeler et al. |
| 2013/0193223 A1 | 8/2013 | Mei et al. |
| 2013/0293223 A1 | 11/2013 | Youngner et al. |
| 2014/0002066 A1 | 1/2014 | Barcat et al. |
| 2014/0179022 A1 | 6/2014 | Smith et al. |
| 2014/0185973 A1 | 7/2014 | Barcat et al. |
| 2015/0301130 A1 | 10/2015 | Stark et al. |
| 2015/0345994 A1 | 12/2015 | Mase |
| 2016/0245674 A1* | 8/2016 | Ausserlechner ....... G01D 11/24 |
| 2016/0313649 A1 | 10/2016 | Hol et al. |
| 2017/0052043 A1 | 2/2017 | Hernandez-Oliver et al. |
| 2017/0370747 A1 | 12/2017 | Uchida et al. |
| 2018/0242480 A1 | 8/2018 | Liu et al. |
| 2019/0018080 A1 | 1/2019 | Marauska et al. |
| 2020/0011705 A1 | 1/2020 | Zwijze et al. |
| 2020/0072641 A1* | 3/2020 | Zhao ..................... H02K 29/08 |
| 2020/0072642 A1 | 3/2020 | Ganser et al. |
| 2020/0191616 A1 | 6/2020 | Islam et al. |
| 2021/0048320 A1* | 2/2021 | Marauska ................ G01D 5/16 |

FOREIGN PATENT DOCUMENTS

| | | |
|---|---|---|
| CN | 1708692 A | 12/2005 |
| CN | 1751247 A | 3/2006 |
| CN | 102326053 A | 1/2012 |
| CN | 102859218 A | 1/2013 |
| CN | 105900017 A | 8/2016 |
| CN | 206164277 U | 5/2017 |
| CN | 109254252 A | 1/2019 |
| CN | 109416261 A | 3/2019 |
| CN | 110199577 A | 9/2019 |
| CN | 110701995 A | 1/2020 |
| DE | 102010038936 A1 | 2/2012 |
| EP | 1557676 A1 | 7/2005 |
| EP | 2968709 A2 | 1/2016 |
| EP | 2652448 B1 | 12/2018 |
| FR | 2937722 A1 | 4/2010 |
| WO | 2014/145018 A2 | 9/2014 |

OTHER PUBLICATIONS

"OrbisTM Rotary Absolute Magnetic Encoder Module." RLS: Rotary and Linear Motion Sensors, www.rls.si/eng/orbis-true-absolute-rotary-encoder. Accessed Jun. 15, 2021.
CN Office Action Mailed on Oct. 14, 2023 for CN Application No. 202110285226, 10 page(s).
English translation of CN Search report dated Oct. 14, 2023 for CN Application No. 202110285226, 3 page(s).
English translation of FR Notice of Allowance dated Feb. 27, 2023 for FR Application No. 2102664, 1 page(s).
English translation of FR Notice of Allowance dated Jun. 30, 2023 for FR Application No. 2304245, 1 page(s).
Final Rejection Mailed on Jul. 5, 2023 for U.S. Appl. No. 17/204,314, 15 page(s).
FR Notice of Allowance Mailed on Feb. 27, 2023 for FR Application No. 2102664, 1 page(s).
FR Notice of Allowance Mailed on Jun. 30, 2023 for FR Application No. 2304245, 1 page(s).
FR Office Action Mailed on May 12, 2022 for FR Application No. 2102664.
IN Office Action Mailed on Dec. 28, 2021 for IN Application No. 202011012802.
IN Office Action Mailed on Nov. 16, 2023 for IN Application No. 202011012802.
Non-Final Rejection Mailed on Jan. 3, 2023 for U.S. Appl. No. 17/204,314, 12 page(s).
Notice of Allowance and Fees Due (PTOL-85) Mailed on Dec. 14, 2023 for U.S. Appl. No. 17/204,314, 2 page(s).
Notice of Allowance and Fees Due (PTOL-85) Mailed on Jan. 5, 2024 for U.S. Appl. No. 17/204,314, 2 page(s).
Notice of Allowance and Fees Due (PTOL-85) Mailed on Oct. 4, 2023 for U.S. Appl. No. 17/204,314, 10 page(s).
CN Notice of Allowance Mailed on May 2, 2024 for CN Application No. 202110285226, 8 page(s).
English Translation of FR Office Action dated Jul. 11, 2024 for FR Application No. 2304245, 14 page(s).
English translation of FR Search report dated Jul. 16, 2024 for FR Application No. 2304246, 14 page(s).
FR Search report Mailed on Jul. 11, 2024 for FR Application No. 2304245, 12 page(s).
FR Search report Mailed on Jul. 16, 2024 for FR Application No. 2304246, 12 page(s).

* cited by examiner

SENSOR ASSEMBLY FOR A ROTARY SENSOR

CROSS-REFERENCE TO RELATED APPLICATIONS

This application is a continuation of U.S. patent application Ser. No. 17/204,314, filed Mar. 17, 2021, which claims priority pursuant to 35 U.S.C. 119(a) of India Patent Application No. 202011012802, filed Mar. 24, 2020, each of which is incorporated herein by reference in its entirety.

TECHNOLOGICAL FIELD

Example embodiments of the present disclosure relate generally to rotary sensors, and more particularly, to a rotary sensor having multiple sensor elements for measuring position of a rotary shaft.

BACKGROUND

Rotary sensors are generally used in heavy machines, such as cranes, excavators, and dozers, to detect change in position of movable components of the machines. The change in position is determined in terms of an angular movement of a rotary component with respect to a stationary component. Rotary sensors generally have a magnetic sensor coupled to the stationary component and a rotary shaft having a permanent magnet coupled to the rotary component. During operation, a change in magnetic field of the permanent magnet is detected with respect to the magnetic sensor and a corresponding change in position is determined for the rotary component.

The heavy machines to which these rotary sensors are attached generally have multiple ferrous components that interfere with the magnetic field of the magnetic sensor and the permanent magnet. The interference causes erroneous and inaccurate readings by the magnetic sensor.

The Applicant has identified several technical challenges associated with sensor assemblies of rotary sensors. Through applied effort, ingenuity, and innovation, many of these identified challenges have been overcome by developing solutions that are included in embodiments of the present disclosure, many examples of which are described in detail herein.

BRIEF SUMMARY

The illustrative embodiments of the present disclosure relate to a sensor assembly for a rotary sensor. The sensor assembly includes a sensor housing, a sensor shield, and a sensor. The sensor housing defines a cavity and the sensor shield is disposed within the cavity. The sensor shield defines a slot along a length of the sensor shield, wherein the sensor shield is composed of a highly permeable material. The sensor is disposed within the cavity such that at least a portion of the sensor is positioned within the slot of the sensor shield. The sensor comprises a printed circuit board, wherein the printed circuit board comprises a plurality of sensor elements disposed along an inner circumference of the printed circuit board. The sensor elements are positioned in a radially outward direction, and each sensor element is positioned at an equal distance from each other.

In an example embodiment, the sensor assembly comprises at least one bearing disposed within the sensor housing and positioned adjacent to the inner circumference of the printed circuit board.

In an example embodiment, the at least one bearing is placed in the cavity and is engaged with the rotary shaft.

In an example embodiment, the plurality of sensor elements comprises magneto-resistive elements.

In an example embodiment, the sensor is electrically connected to an Application Specific Integrated Circuit (ASIC).

In an example embodiment, the sensor and the sensor shield have the same shape. For instance, the sensor and the sensor shield may be of a semi-circular shape.

In an example embodiment, a sensor assembly for a rotary sensor is provided. The sensor assembly comprises a sensor housing, a sensor shield, and a sensor. The sensor housing defines a cavity. The sensor shield has a first plate and a second plate, the first plate coupled to a first side of the sensor housing and the second plate coupled to a second side of the sensor housing. In an example, the sensor shield is composed of a highly permeable material. The sensor comprises a printed circuit board, wherein the sensor is disposed within the cavity of the sensor housing. In an example, the sensor comprises a first array of sensor elements that are disposed along an inner circumference of the printed circuit board in a radially outward direction, wherein the first array of sensor elements is disposed on a first side of the printed circuit board. The sensor also comprises a second array of sensor elements along the inner circumference of the printed circuit board and disposed on the first side of the printed circuit board.

In an example embodiment, the sensor shield is disposed within the cavity of the sensor housing.

In an example embodiment, the first array of sensor elements and the second array of sensor elements are electrically isolated from each other.

In some embodiments, the sensor housing comprises at least one bearing, wherein the at least one bearing is positioned adjacent to the inner circumference of the printed circuit board.

In an example embodiment, the at least one bearing is configured to engage with a rotary shaft, wherein the rotary shaft is attached to a rotary component of a machine.

In some embodiments, each array of the first and second arrays of sensor elements comprises a plurality of sensor elements. Each sensor element of the plurality of sensor elements is placed at an equal distance from each other.

In some embodiments, each sensor element comprises a magneto-resistive element.

In some embodiments, for each of the first array and the second array, the sensor elements are aligned along the printed circuit board, such that the sensor elements define a range of angle from about 0°-145°.

In an example embodiment, in the sensor assembly, the sensor has a semi-circular shape and has a diameter of about 110 millimeters (mm).

In an example embodiment, a rotary sensor for detecting a change in position of a rotary shaft is provided. The rotary sensor comprises a sensor housing, a sensor, a bearing, and the rotary shaft. The sensor housing defines a cavity. The sensor is disposed within the cavity and it comprises a printed circuit board comprising a plurality of sensor elements. The plurality of sensor elements is disposed along an inner circumference of the printed circuit board in a radially outward direction. The bearing is disposed within the cavity of the sensor housing and positioned adjacent to the inner circumference of the printed circuit board. The rotary shaft is engaged with the bearing and rotatable about a rotational axis. The sensor housing, the bearing, and the rotary shaft are aligned along the rotational axis.

In an example embodiment, the rotary shaft comprises a permanent magnet disposed on an end of the rotary shaft that is closest to the sensor.

In some embodiments, the rotary sensor also comprises a pivot pin coupled to the sensor housing along the rotational axis of the rotary shaft.

In some embodiments, the rotary sensor comprises a sensor shield defining a slot along a length of the sensor shield, wherein the sensor shield is composed of a highly permeable material.

In an example embodiment, the sensor is electrically connected to an Application Specific Integrated Circuit (ASIC).

In some embodiments, the sensor elements are aligned on the printed circuit board such that each sensor element is positioned at an equal distance from each other.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1B:
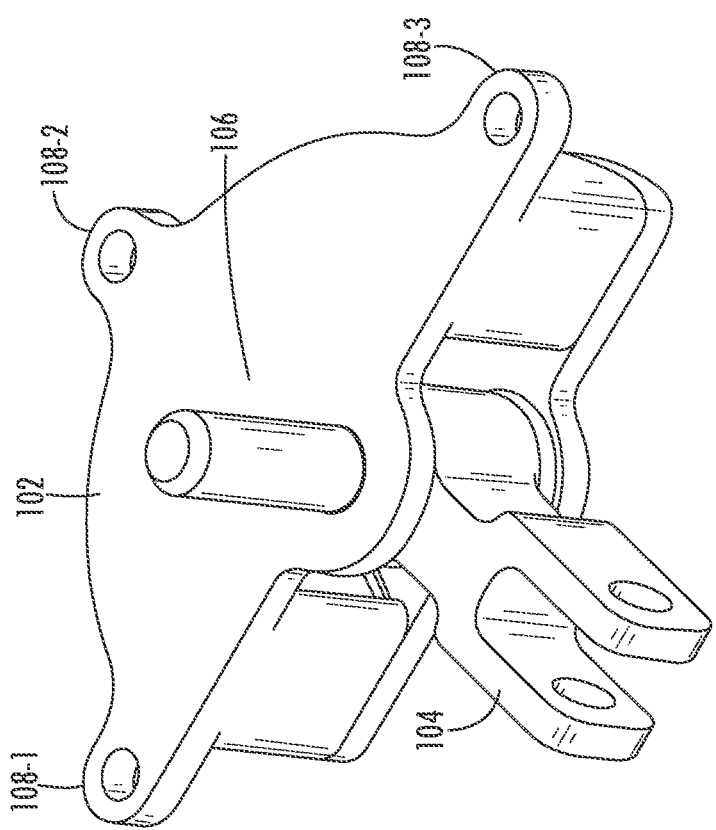
FIGS. 1A-1D illustrate various exterior views of rotary sensors, in accordance with an example embodiment of the present disclosure.
Figure 1A:
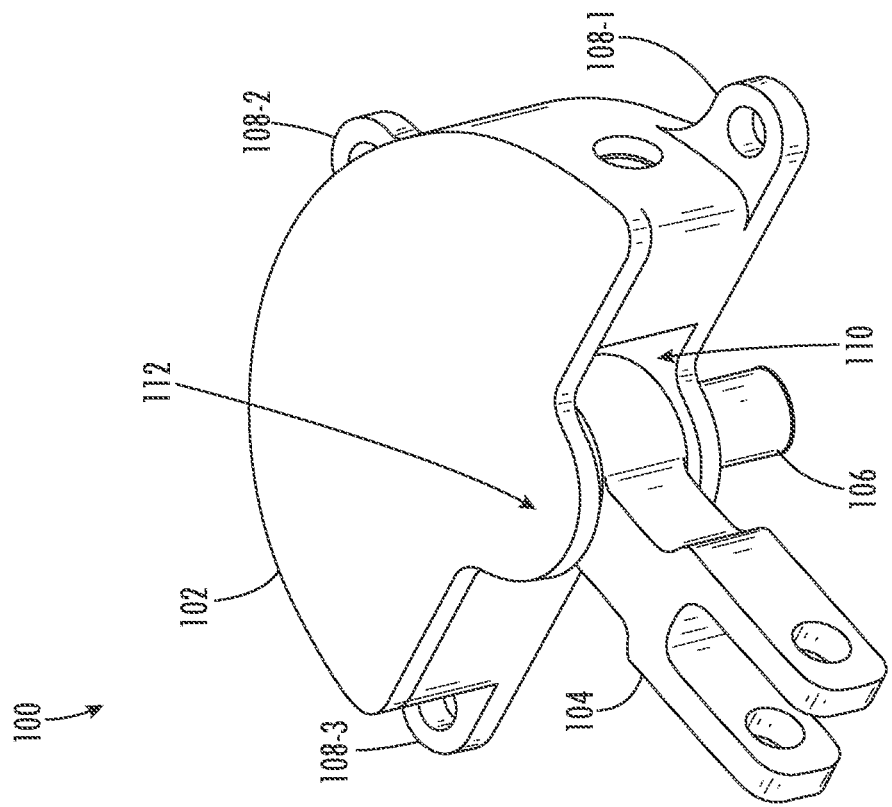

Some embodiments of the present disclosure will now be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various example embodiments described herein such that embodiments may include fewer or more components than those shown in the figures while not departing from the scope of the disclosure.

Turning now to the drawings, the detailed description set forth below in connection with the appended drawings is intended as a description of various example configurations and is not intended to represent the only configurations in which the concepts described herein may be practiced. The detailed description includes specific details for the purpose of providing a thorough understanding of various concepts with like numerals denoting like components throughout the several views. However, it will be apparent to those skilled in the art of the present disclosure that these concepts may be practiced without these specific details.

In many example industrial working environments, such as mining, tunneling, quarrying, ship building, construction, heavy industry engineering, power industry, and forestry, heavy machines are used for, amongst other operations, transferring heavy goods from one point to another. These machines generally have multiple movable or rotary components, such as arms, boom, bucket and cabin. During operation of the machines, the movement and change in position of these rotary components is determined by a rotary sensor coupled to a rotary component along a pivot point of a machine. Readings captured by the rotary sensor aids in determining that the machine is operating normally. To this end, some existing rotary sensors may not be efficient in capturing accurate readings due to effect of magnetic hysteresis and interference from external ferrous components in the machine. The existing rotary sensors have complex structures that makes mounting of the rotary sensor onto the machines complex and cumbersome.

Various example embodiments described in the present disclosure relate to a rotary sensor and a sensor assembly of the rotary sensor for detecting a change in position of a rotary shaft during operation of the machine. The rotary sensor has a rotary shaft and a sensor. The rotary shaft is coupled to a rotary component of the machine. The rotary shaft has a permanent magnet disposed within a top portion of the rotary shaft. The sensor has a plurality of sensor elements disposed along a surface of the sensor. In an example, the sensor is positioned inside a sensor shield that isolates the sensor from interference in the magnetic field from adjacent ferrous objects. When the rotary shaft rotates, the permanent magnet changes position, causing a change in magnetic field of the magnet. This change in magnetic field is detected by the sensor elements as change in voltage and the change in voltage is used to determine the change in position of the rotary shaft. In one example, the sensor elements are magneto-resistive elements that have high sensitivity and can operate in a wide temperature range.

FIGS. 1A-1D illustrate various exterior views of a rotary sensor 100 in accordance with an example embodiment of the present disclosure. As shown, the rotary sensor 100 may include a sensor housing 102, a rotary shaft 104, and a pivot pin 106. The sensor housing 102, as shown in FIGS. 1A-1D, has a semi-circular shape or an arc-shape. Although shown as a semi-circular shape, the sensor housing 102 may also have other shapes, such as a circular shape or a segment shape. In an example, the shape of the sensor housing 102 is varied based on the shape of a sensor used inside the sensor housing 102 and a range of angle for position sensing. For instance, when the range of angle is about 0°-360°, then a circular sensor may be used and the sensor housing 102 may also be circular in shape. The sensor housing 102, in one example, is a metallic component made of die-cast aluminum. As would be understood, any other suitable light-weight metal providing easy mounting may also be used for the sensor housing 102.

The sensor housing 102 also has three mounting holes 108-1, 108-2 and 108-3, to receive mounting pins or screws in the mounting holes 108-1, 108-2 and 108-3. The mounting holes 108-1, 108-2 and 108-3 have a circular shape. In an example, the shape and diameter of the mounting holes 108-1, 108-2, and 108-3 are selected based on the type of mounting pins or screws. In one example, diameter of the mounting holes 108-1, 108-2 and 108-3 may vary based on thickness or diameter of the mounting pins or screws. The sensor housing 102 has an opening 110 to provide space for rotation of the rotary shaft 104. In an example, size and width of the opening 110 may be based on the degree of movement or rotation of the rotary shaft 104.

The rotary shaft 104 has a rotational axis along which the rotary shaft 104 can rotate. A portion of the rotary shaft 104 is inserted within the sensor housing 102. The rotary shaft 104 is engaged with a bearing within the sensor housing 102. In an example, the sensor housing 102 is designed such that a curved portion 112 of the sensor housing 102 extends outwardly from the sensor housing 102 to cover a point of engagement of the bearing and the rotary shaft 104. Such a design of the sensor housing 102 allows the bearing and the sensor to be disposed in one housing thereby providing a unitary structure to the rotary sensor 100.

The rotary shaft 104 is engaged with the bearing such that the rotary shaft 104 has a vertical displacement or an offset of 1 millimeter (mm) In other words, the rotary shaft 104 when engaged with the bearing may not displace or shift from its center position more than 1 mm Such an arrangement of the rotary shaft 104 with the bearing provides for minimum vibration during operation of the rotary sensor 100. The rotary shaft 104, in an example, can be a clevis having a hole to receive a connector and join with the rotary component of the machine.

The pivot pin 106 is attached to the sensor housing 102 and is aligned along the rotational axis of the rotary shaft 104. One end of the pivot pin 106 has a flat plate that is disposed within the sensor housing 102 and is affixed to an inner wall of the sensor housing 102. In one example, the flat plate has a circular shape. The pivot pin 106, in an example, aids in locating a point for mounting the rotary sensor 100 onto the machine and the mounting holes 108-1, 108-2 and 108-3 allow easy mounting of the rotary sensor 100 on the machine. In an assembled state, the pivot pin 106, the rotary shaft 104, and the sensor housing 102 are aligned along the rotational axis of the rotary shaft 104. For use of the rotary sensor 100 in the machine, the rotary shaft 104 is coupled to a rotary or a movable component of the machine. For example, the clevis is attached to the rotary component using the connector. The sensor housing 102 is attached to another component of the machine that is stationary.

Figure 1D:
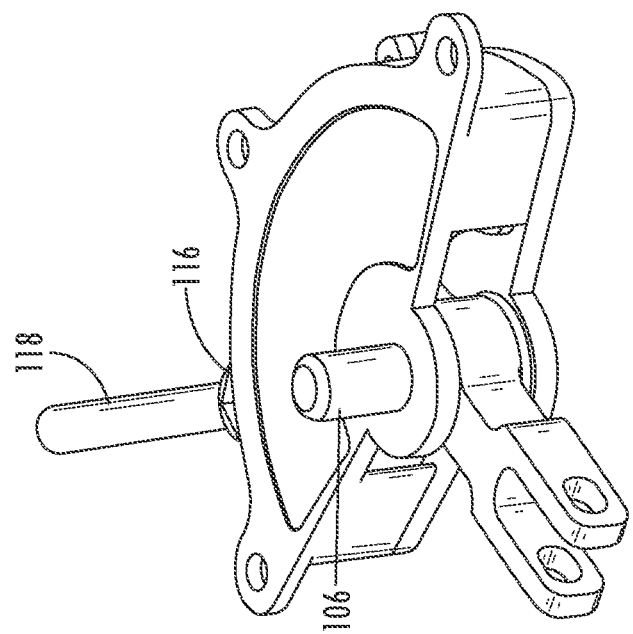
Figure 1C:
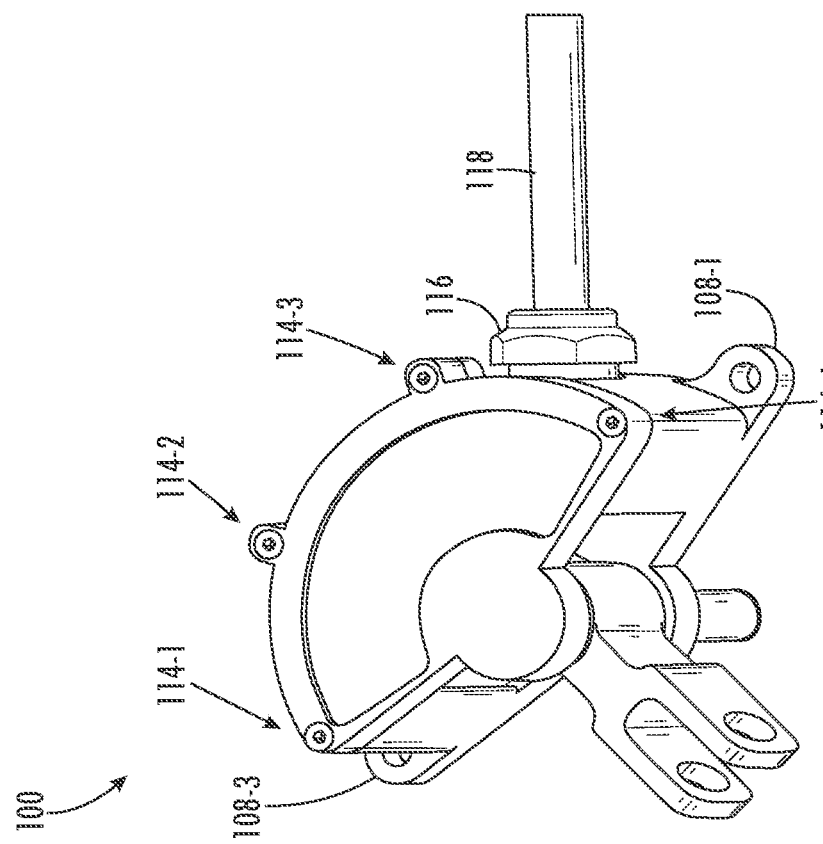

In an example embodiment, as shown in FIGS. 1C and 1D, the rotary sensor 100 may also have screws 114-1, 114-2, 114-3 and 114-4 for assembling the sensor housing 102. The screws 114-1, 114-2, 114-3 and 114-4 couple a first part of the housing 102 to a second part of the housing 102. The rotary sensor 100 also comprises a cable gland 116 and a cable 118. The cable gland 116 provides an opening in the sensor housing 102 of the rotary sensor 100. A portion of the cable gland 116 is within the sensor housing 102 and a portion of the cable gland 116 is outside the sensor housing 102. The cable 118 is electrically connected to a sensor disposed within the sensor housing 102 through the cable gland 116.

Figure 2A:
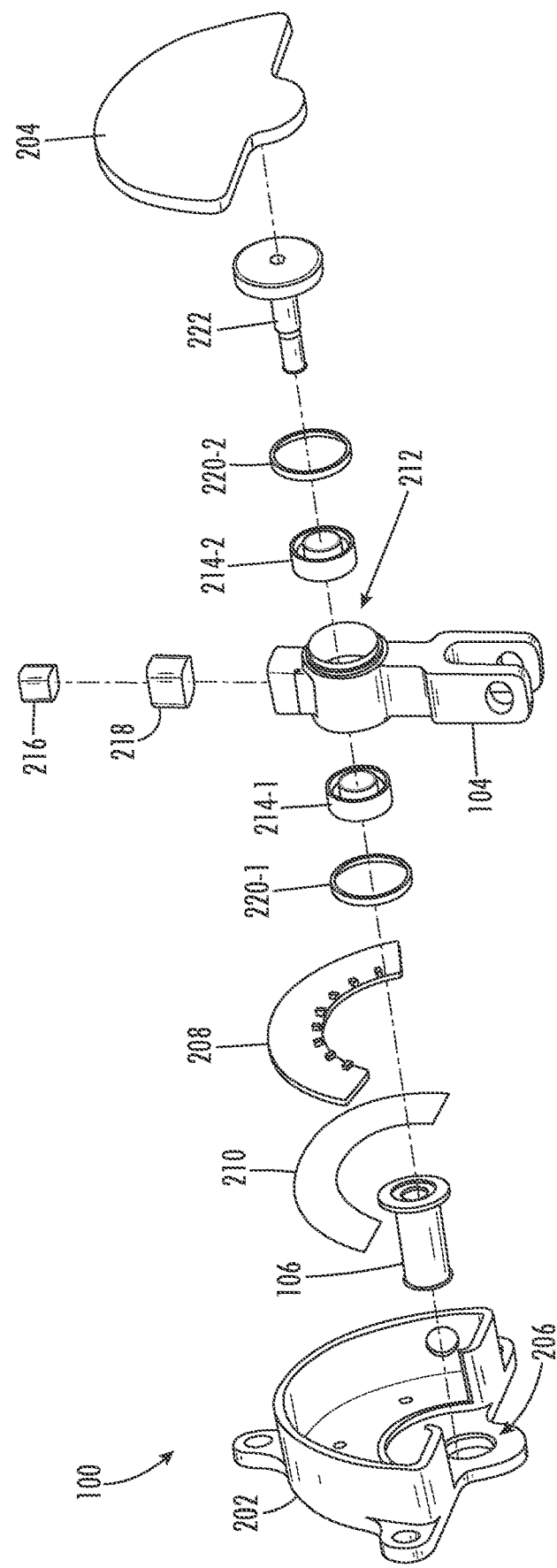
FIGS. 2A and 2B are exploded views of various rotary sensors for detecting a change in position of a rotary shaft, in accordance with an example embodiment of the present disclosure.
Figure 2B:
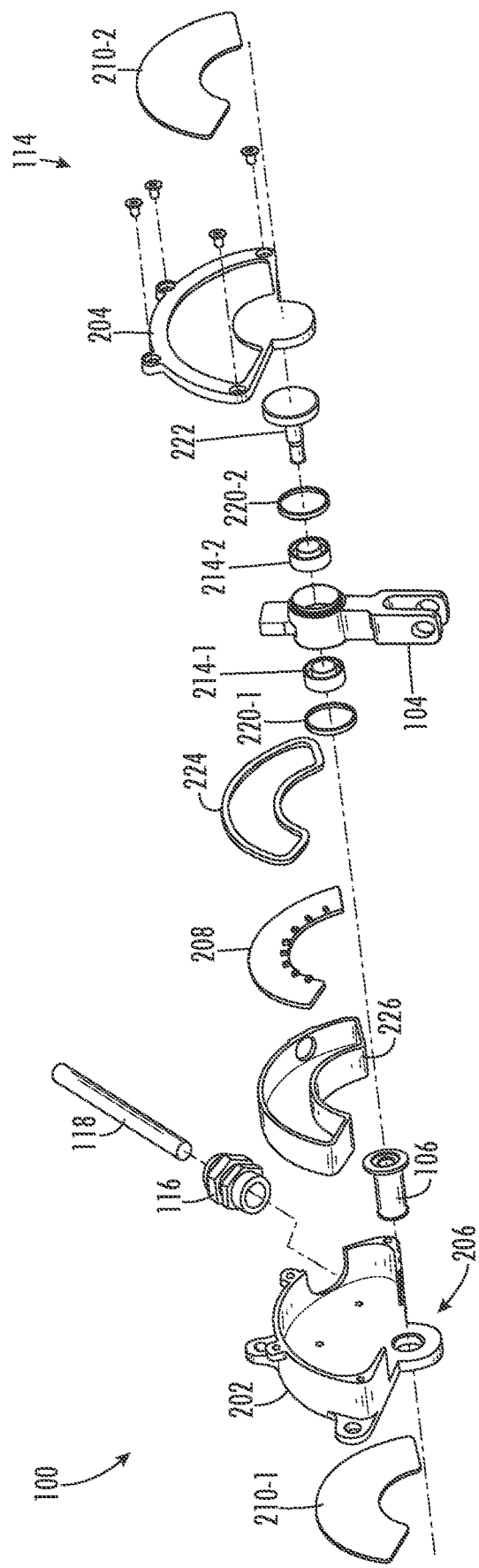
Figure 3B:
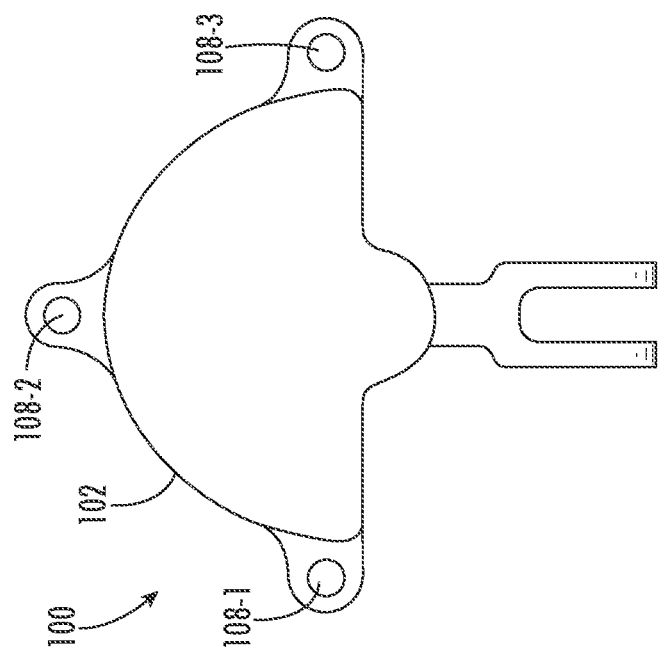
FIGS. 3A-3E illustrate various views of rotary sensors and components of the rotary sensors, in accordance with an example embodiment of the present disclosure.
Figure 3C:
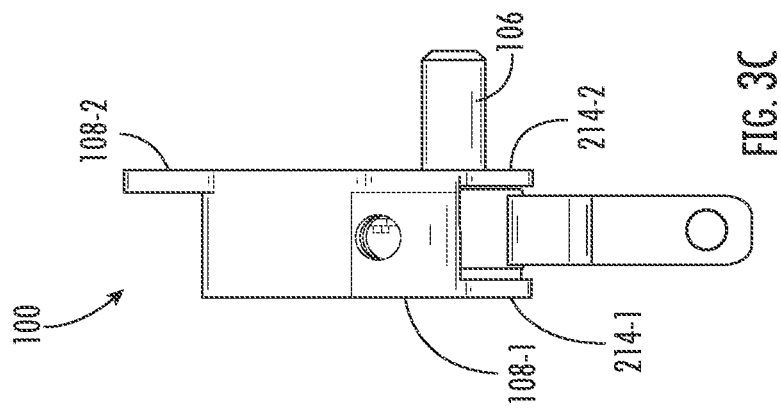
Figure 3A:
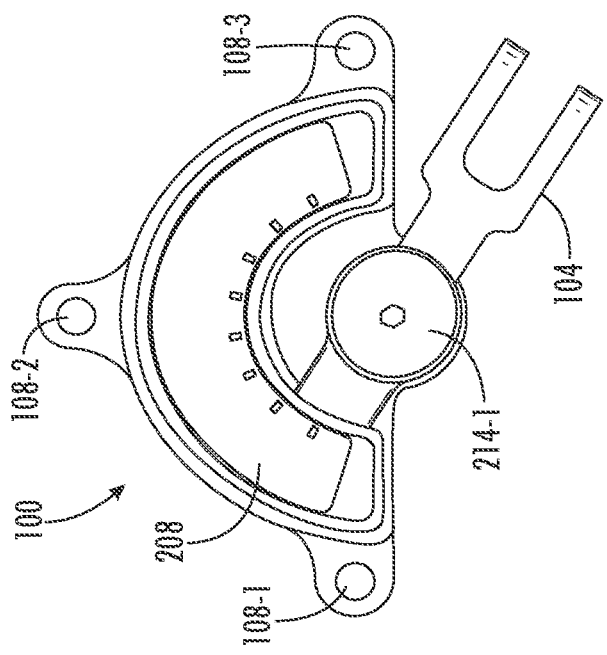
Figure 3E:
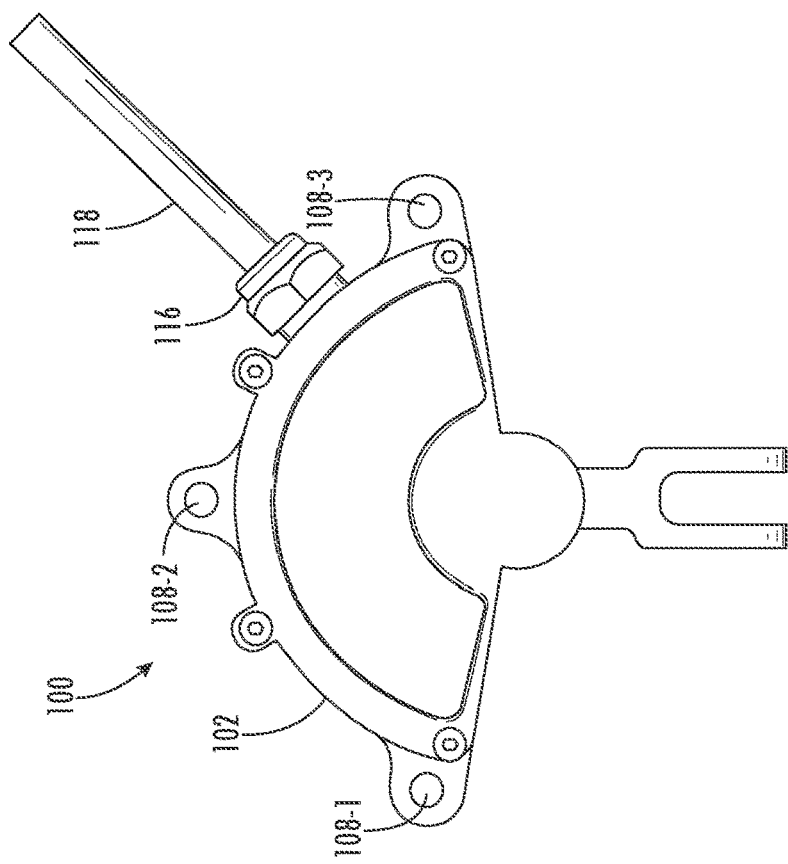
Figure 3D:
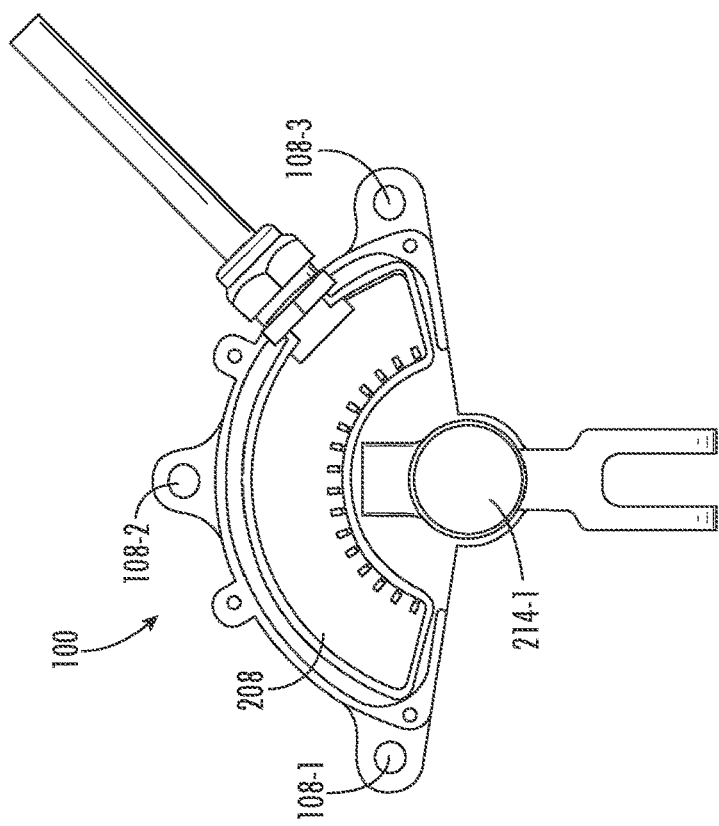

Referring now to FIGS. 2A and 2B, exploded views of the rotary sensor 100 are provided. In some embodiments, the sensor housing 102 has two parts, a first part 202 and a second part 204. The first part 202 and the second part 204 are removably attached to each other. In an example, the first part 202 and the second part 204 may be snap fitted with each other. The first part 202 defines the mounting holes 108-1, 108-2 and 108-3, as described earlier, and the second part 204 is a cover that fits onto the first part 202. The first part 202 also defines an aperture 206 to receive the pivot pin 106. In an example, the aperture 206 is within the curved portion 112 of the first part 202. In the assembled state, the first part 202 and the second part 204 define a cavity to house components of the rotary sensor 100.

The rotary sensor 100 also comprises a sensor 208, and a sensor shield 210. The sensor shield 210 defines a slot and the sensor 208 is inserted within the slot of the sensor shield 210. In some embodiments, as shown in FIG. 2B, the shield 210 may have a first plate 210-1 and a second plate 210-2. The first plate 210-1 is attached to the first part 202 of the sensor housing 102 from an external side. The second plate 210-2 is attached to the second part 204 of the sensor housing 102 from an external side. The rotary sensor 100 also has screws 114 for coupling the first part 202 and the second part 204. The rotary sensor 100 also has a cable gland 116 and a cable 118 as shown. The cable gland 116 and the cable 118 are attached to the sensor housing 102. The rotary shaft 104 may have a shaft aperture 212. Bearings 214-1 and 214-2 are disposed within the shaft aperture 212 and rotatably engaged with the rotary shaft 104, such that the rotary shaft 104 is rotatable about its rotational axis when engaged with the bearings 214-1 and 214-2. In one example embodiment, a top part of the rotary shaft 104 may define a shaft cavity to receive a permanent magnet 216 and a magnetic liner 218. The permanent magnet 216 is disposed within the top part of the rotary shaft 104 along with the magnetic liner 218.

Rings 220-1 and 220-2, also referred to as O-rings, are attached to the bearings 214-1 and 214-2 for proper fitting of the bearings 214-1 and 214-2 within the shaft aperture 212. The rings 220-1 and 220-2 may be understood as mechanical gaskets or a loop of pliable material with a disc-shaped cross-section. In an example, the rings 220-1 and 220-2 are designed to be seated into a groove within the shaft aperture 212. The rings 220-1 and 220-2 are compressed during assembly between two or more parts, creating a seal. For instance, the rings 220-1 and 220-2 are disposed between the bearings 214-1 and 214-2, and an inner wall of the shaft aperture 212. Such an arrangement reduces vertical displacements and vibrations caused when the rotary shaft 104 rotates or moves during operation and causes the rotary shaft 104 to smoothly rotate within the sensor housing 102.

Further, the rings 220-1 and 220-2 maintain sealing contact force by radial or axial deformation in the shaft aperture 212 between the bearings 214-1 and 214-2 and the rotary shaft 104. The rotary sensor 100 has a pin 222. The pin 222 is positioned into a cavity of the pivot pin 106. In various embodiments, the engagement of the pin 222 with the pivot pin 106 may secure the rotary shaft 104 and the sensor 208 to the sensor housing 102 and cause the rotary sensor 100 to remain as a unitary piece. In one example, the rotary sensor 100 comprises a gasket 224 and a Printed Circuit Board Assembly (PCBA) housing 226, as shown in FIG. 2B.

FIGS. 3A-3E illustrate various views of the rotary sensor 100, in accordance with an example embodiment of the present disclosure. As shown, the rotary shaft 104 is engaged with the bearings 214-1 and 214-2 and is rotatable along the rotational axis. The sensor 208 comprises a printed circuit board that is arc-shaped or semi-circular shaped. In another example, the sensor 208 may also have other shapes, such as a circular shape. In various embodiments, the rotary shaft 104 is aligned with the sensor 208 such that a top edge of the rotary shaft 104 is positioned adjacent to an inner circumference of the sensor 208 and when the rotary shaft 104 changes position, the top edge of the rotary shaft 104 moves along the inner circumference of the sensor 208.

A top portion 302 of the rotary shaft 104 has a shaft cavity which receives the magnetic liner 218 and the magnet 216. In one example, the shape of the cavity is square or rectangular. Based on the shape of the cavity, the shape of the magnet 216 is selected to be square or rectangular. The distance between the sensor 208 and the top edge of the rotary shaft 104 is constant in whichever position the rotary shaft 104 moves. In one example, the distance between the top edge of the rotary shaft 104 and the inner circumference of the sensor 208 is predefined. Based on the distance between the top edge of the rotary shaft 104 and the sensor 208, an amount of magnetic flux of the magnet 216 linking the sensor 208 may vary. For instance, if the top edge of the rotary shaft 104 is placed very close to the sensor 208, then a higher magnitude of magnetic flux passes through the sensor 208. If the top edge is positioned at a distance from the sensor 208, then the amount of magnetic flux linking the sensor 208 reduces. The magnitude of magnetic flux linking the sensor 208 also affects the readings captured by the sensor 208.

In another example, the size of the magnet 216 is also predefined. The size of the magnet 216 also affects the magnitude of magnetic flux linking the sensor 208. A magnet 216 of bigger size has a higher magnitude of magnetic flux linking the sensor 208 and a magnet 216 of a smaller size has a lower magnitude of magnetic flux linking the sensor 208.

The pivot pin 106, as shown, protrudes outwardly from the sensor housing 102 that aids in locating a point of mounting for the rotary sensor 100, as described earlier. In an example, the length of the pivot pin 106 may be based on the type of machine component of the machine on which the rotary sensor 100 may be mounted. As described earlier, the pivot pin 106 may be used for mounting the rotary sensor 100 and the pivot pin 106 aids in locating the point of mounting. During mounting, the pivot pin 106 may be centered at the point of mounting and the mounting holes 108-1, 108-2 and 108-3 may be affixed to the machine component using suitable connectors.

Further, the mounting holes 108-1, 108-2 and 108-3 are separated by a separation angle of about 90°. In various embodiments, the mounting holes 108-1, 108-2 and 108-3 may be either two or more than three and may be separated by an angle other than 90°. The separation between the mounting holes 108-1, 108-2 and 108-3 and the number of mounting holes is determined based on the structure and configuration of the machine component on which the rotary sensor 100 is mounted.

In various embodiments, the sensor 208 is electrically connected to an Application Specific Integrated Circuit (ASIC) (not shown in the figures). In various other embodiments, the sensor 208 may be electrically connected to two or more ASICs based on configuration of the sensor 208. In embodiments where two or more ASICs are used for processing data, one ASIC is used as master ASIC and the other ASICs work as slave ASICs. The slave ASICs receive data from the sensor 208. In one example, the data may be change in voltage output as detected by the sensor 208. After receiving the data, the slave ASICs may process the data to determine change in position of the rotary shaft 104 and each slave ASIC may forward the change in position data to the master ASIC. The master ASIC receives data from all the slave ASICs and computes the final change in position of the rotary shaft 104.

Figure 4A:
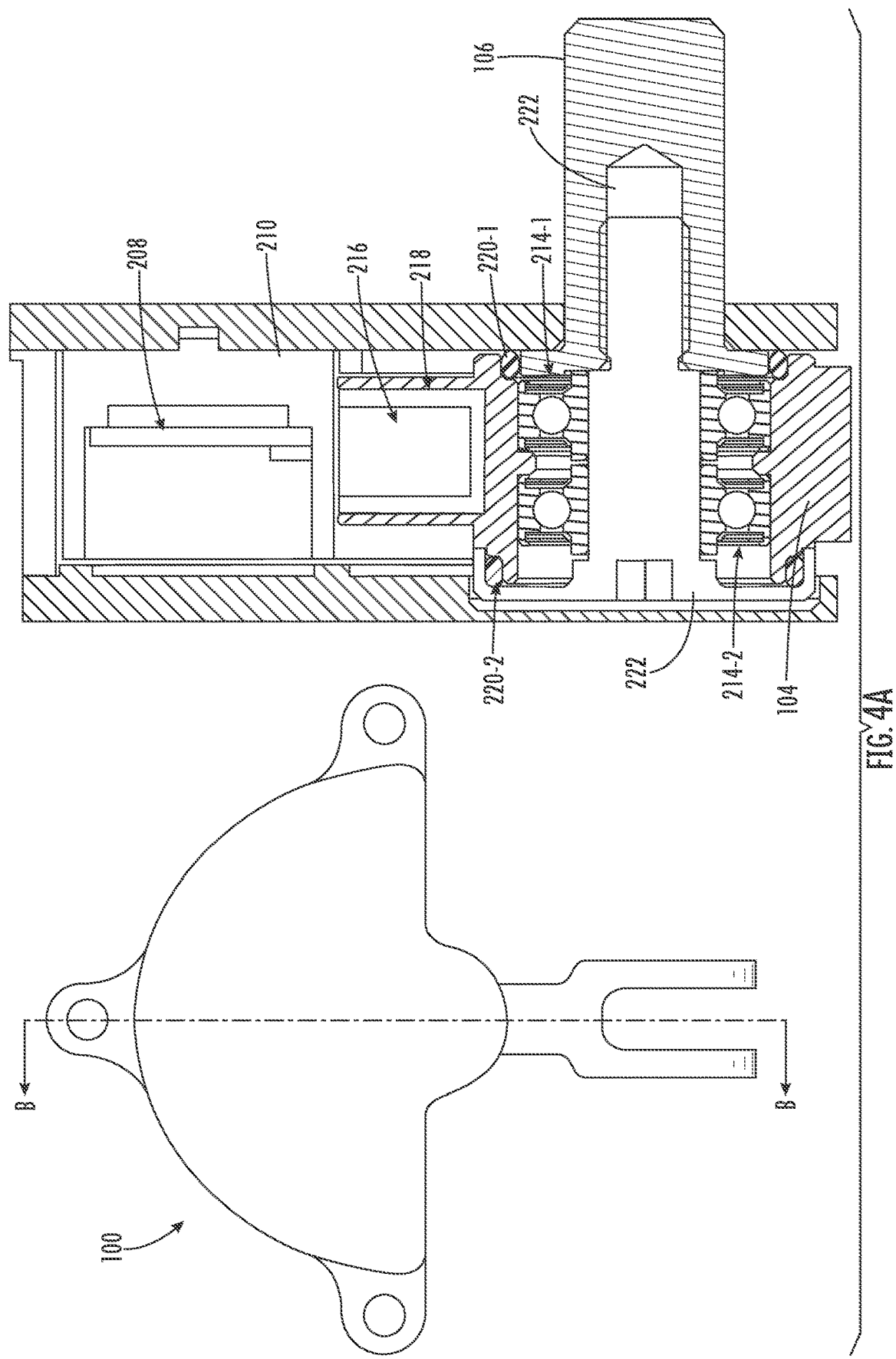
FIGS. 4A and 4B are cut-away side views of rotary sensors, in accordance with an example embodiment of the present disclosure.
Figure 4B:
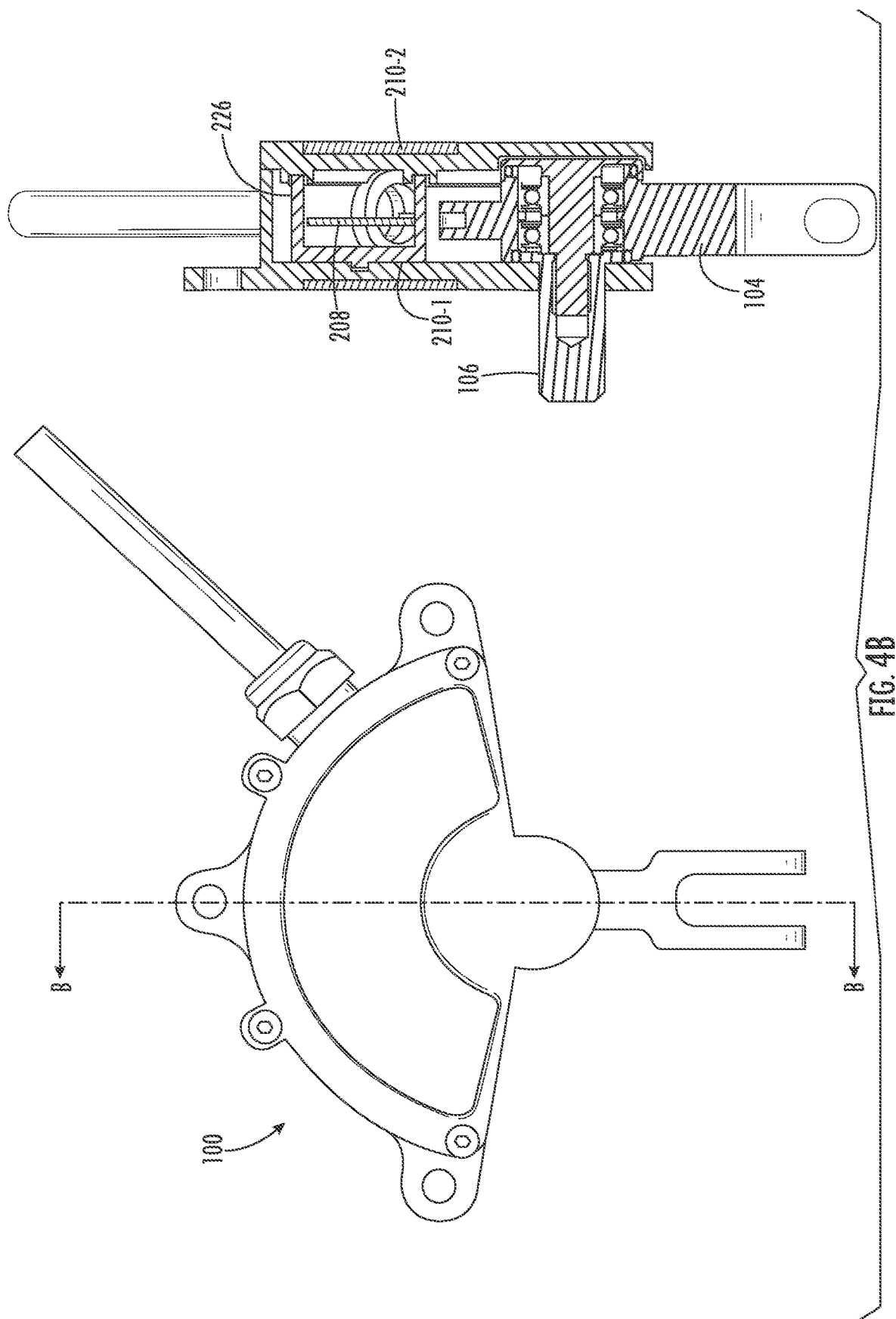

FIGS. 4A and 4B illustrate cross-sectional views of the rotary sensor 100 taken along line B-B of each view respectively, in accordance with an example embodiment of the present disclosure. As shown, the rotary shaft 104 is engaged with the bearings 214-1 and 214-2. The bearings 214-1 and 214-2 are engaged with the rings 220-1 and 220-2. The pin 222 has a flat plate on one end and a protrusion on the other end. The pin 222 is disposed such that in an assembled state, the flat plate end of the pin 222 is coupled to one side of the rotary shaft 104 and the protrusion is received within the cavity of the pivot pin 106. As shown, the protrusion is received within a portion of the cavity of the pivot pin 106. As described earlier, the flat plate end of the pin 222 is attached to the inner wall of the sensor housing 102. In an example, the pin 222 and the pivot pin 106 engage with each other such that the engagement of the two secures the rotary shaft 104 and the bearings 214-1 and 214-2 to the sensor housing 102.

The sensor 208 is encased within the sensor shield 210. The sensor 208 as shown is either completely encased within the sensor shield 210 or can be partially encased within the sensor shield 210. The top part of the rotary shaft 104 has the permanent magnet 216 within the magnetic liner 218. The magnet 216, as described above, is positioned adjacent to the sensor 208, such that in any position of the rotary shaft 104, the permanent magnet 216 is adjacent to the inner circumference of the sensor 208. The size of the magnet 216 and distance of the magnet 216 from the sensor 208 is predefined.

The sensor 208 and the bearings 214-1 and 214-2 are housed within one sensor housing 102 providing a unitary piece of the rotary sensor 100.

Figure 5:
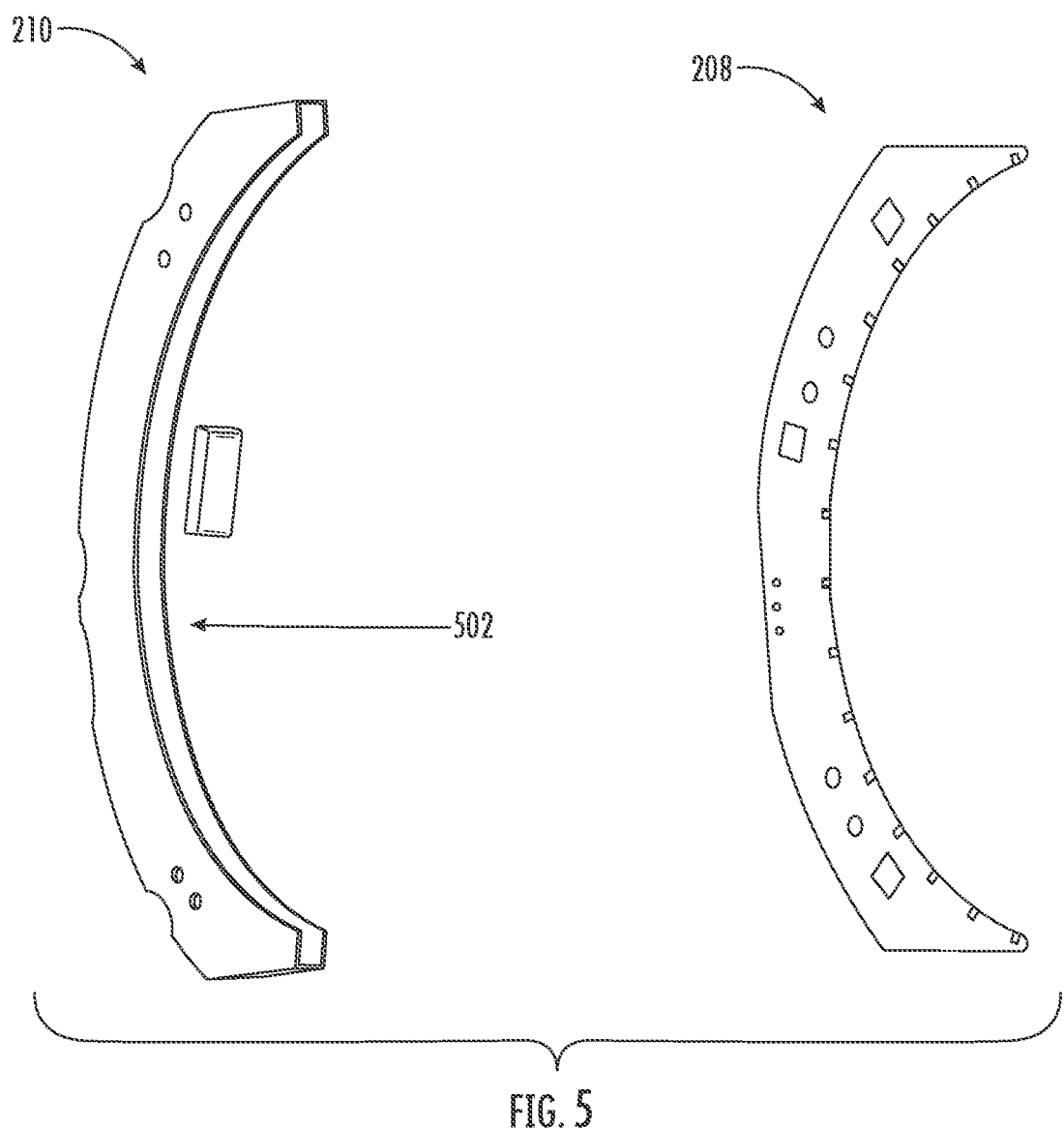
FIG. 5 illustrates a sensor shield of a rotary sensor, in accordance with an example embodiment of the present disclosure.

FIG. 5 illustrates the sensor shield 210, in accordance with an example embodiment of the present disclosure. The sensor shield 210 is composed of a highly permeable material. In one example, the highly permeable material is cold rolled steel sheet. The sensor 208 is used for capturing change in position of the rotary shaft 104 based on change in magnetic field. Where the rotary sensor 100 is implemented, there are many ferrous components of the machine, as described earlier. The adjacent ferrous components having high permeability may affect the magnetic field of the sensor 208 and readings captured by the sensor 208 thereby causing erroneous readings.

The sensor shield 210 having highly permeable material acts as a polepiece to provide a uniform field to the sensor 208 irrespective of a mounting environment having multiple ferrous components. In some embodiments, the sensor shield 210 may include two separate highly permeable plates above and below the sensor 208. As described earlier, the sensor shield 210 either partially encases the sensor 208 or completely encases the sensor 208. In an example, the sensor shield 210 is determined to encase the sensor 208 partially or completely based on various factors, such as the number of ferrous objects in the environment where the rotary sensor 100 is mounted, and interference from such ferrous objects.

In various embodiments, the sensor shield 210 has a slot 502 across the length of the sensor shield 210. In some embodiments, the length of the slot 502 is based on the length of the sensor 208 and may vary based on the length of the sensor 208 used. The width of the slot 502 may also vary based on the width of the sensor 208. The width of the slot 502 may also vary based on whether the sensor 208 is completely or partially inserted within the sensor shield 210. In another example, the sensor shield 210 is molded within the sensor housing 102, such that a separate sensor shield 210 is not required. In another example, as already discussed, the sensor shield 210 has two separate plates, a first plate 210-1 and a second plate 210-2 which are coupled to the sensor housing 102 externally.

Figure 6:
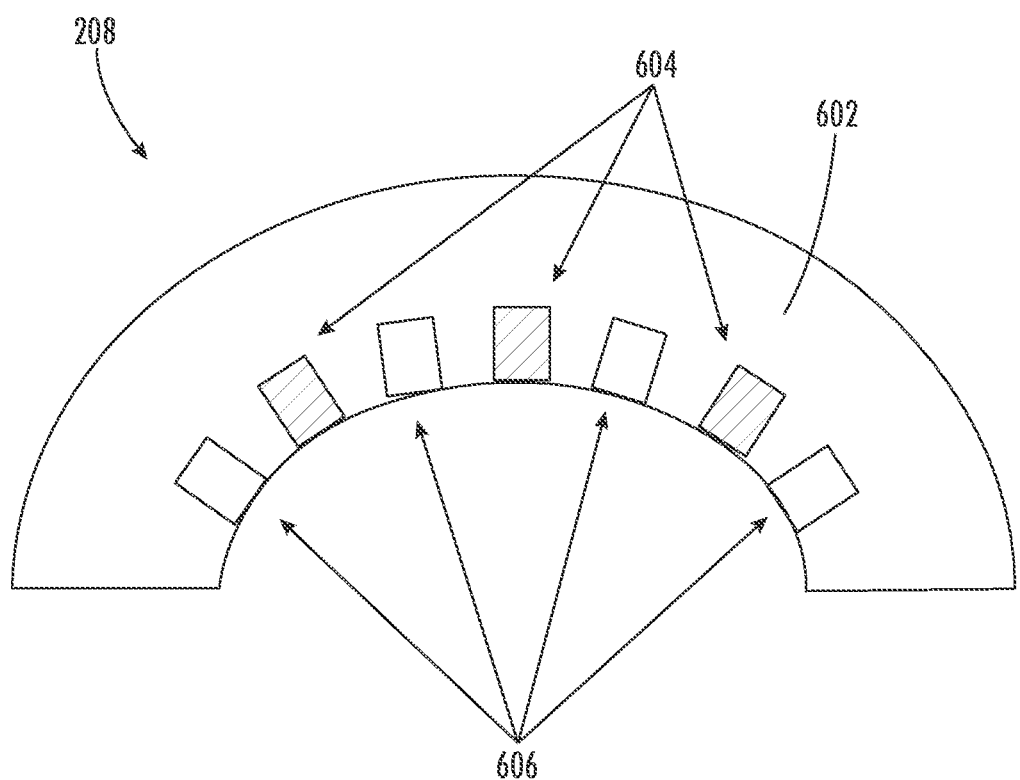
FIG. 6 illustrates a sensor of a rotary sensor, in accordance with an example embodiment of the present disclosure.

FIG. 6 illustrates the sensor 208 of the rotary sensor 100, in accordance with an example embodiment of the present disclosure. In one example, a diameter of the sensor 208 is 110 millimeters (mm) and the width of the sensor 208 is 28 mm. The sensor 208 comprises a Printed Circuit Board (PCB) 602 and a plurality of sensor elements 604, also referred to as a first array of sensor elements. The PCB 602, as shown in FIG. 6, is arc-shaped or semi-circular. The plurality of sensor elements 604 is distributed from one end to another end of the PCB 602 covering a range of angle of about 0°-145°. The size and shape of the PCB 602 may vary based on the sensing range required. For instance, in a case of higher sensing range, from 0°-180° or 0°-360°, the shape of the PCB 602 may be circular.

Each sensor element of the plurality of sensor elements 604 is spaced equally from each other. In one example, the sensor elements 604 may have low resolution due to having a lesser number of sensor elements with more space between each sensor element, or a high resolution due to having a greater number of sensor elements with less space between the sensor elements 604. In an example embodiment, the PCB 602 has a first array of sensor elements 604 aligned on a first side of the PCB 602 and a second array of sensor elements 606 disposed on a second side of the PCB 602 and the first side may be opposite to the second side. In another example, the first array of sensor elements 604 and the second array of sensor elements 606 are disposed on the same side of the PCB 602. The first array and the second array are disposed such that the sensor elements of the first array 604 and the second array 606 are disposed alternately, as shown. In one example, the first array 604 and the second array 606 are electrically isolated from each other and have separate input and output terminals.

The two arrays of sensor elements 604 and 606 enhance reliability of the rotary sensor 100 during fault conditions. In one example, readings are captured from both arrays of sensor elements 604 and 606 and compared. In case of any mismatch in the readings, the sensor 208 may be tested for any fault conditions. Further, in situations when one array of sensor elements fails to operate due to overheating or failure of any component, the other array of sensor elements provides reading for the rotary sensor 100.

In various embodiments, the sensor elements 604 and 606 are Anisotropic Magneto Resistive (AMR) elements. The AMR based sensor elements 604, 606 have high sensitivity and provide accurate readings of the position change of the rotary shaft 104. Additionally, the sensitivity of the sensor elements 604, 606 can be adjusted based on the thickness of a film used in the AMR elements and line width of the AMR elements. The AMR based sensor elements 604 are smaller in size and provide wide voltage and wide temperature operation. Further, the AMR based sensor elements have a long sensing distance and low Gauss operation for which the AMR based sensor elements can be used with low cost magnets.

During operation, in an instance when the rotary component of the machine changes position, the rotary shaft 104 coupled to the rotary component changes position. When the rotary shaft 104 changes the position, the magnet 216 disposed in the top part of the rotary shaft 104 changes its position along with the rotary shaft 104. The magnet 216 has a magnetic field that links with the sensor elements 604 and 606. At a time, the magnetic field of the magnet 216 may link with two sensor elements. As would be understood, the magnetic field may have a magnitude and a vector component. The movement of the magnet 216 causes the vector component of the magnetic field to change and the sensor elements 604 and 606 detect the change in magnetic field. The sensor elements 604 and 606 convert the change in the magnetic field to a change in voltage output and provide this data to the ASIC.

In an example embodiment, when there are large number of sensor elements 604 and 606, then two ASICs may be used to receive a change in magnetic flux from the sensor elements 604 and 606. For instance, if there are eight sensor elements, then one ASIC may be used and when there are more than eight or sixteen elements, then two ASICs may be used. In such an embodiment, there may be a master ASIC used to process output from the two ASICs. Thereafter, the ASIC may convert the change in voltage output to change in position data. The change in position data is indicative of the change in position of the rotary shaft 104.

It must be noted that, as used in this specification and the appended claims, the singular forms "a," "an," and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments, but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present disclosure are disclosed herein; however, it is to be understood that the disclosed embodiments are merely exemplary, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

While it is apparent that the illustrative embodiments herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A sensor assembly for a rotary sensor, comprising:
a sensor housing configured to be secured relative to a mounting environment, the sensor housing defining a cavity;
a sensor shield disposed within the cavity, wherein the sensor shield defines a slot along a length of the sensor shield, wherein the sensor shield is composed of a highly permeable material; and
a sensor disposed within the cavity, wherein at least a portion of the sensor is positioned within the slot of the sensor shield, wherein a printed circuit board comprises a plurality of sensor elements disposed along an inner circumference of the printed circuit board in a radially outward direction, wherein each sensor element of the plurality of sensor elements is positioned at an equal distance from each other;
wherein at least a portion of the sensor shield is disposed between the plurality of sensor elements and the mounting environment such that the sensor shield is configured to act as a polepiece that enables a uniform field to be provided to the sensor by isolating the plurality of sensor elements from a magnetic field defined by a ferrous object within the mounting environment.

2. The sensor assembly as claimed in claim 1 comprising at least one bearing disposed within the sensor housing and positioned adjacent to the inner circumference of the printed circuit board.

3. The sensor assembly as claimed in claim 1, wherein the sensor comprises the printed circuit board having different shapes including an arc shape, a semi-circular shape or a circular shape.

4. The sensor assembly as claimed in claim 1, wherein the plurality of sensor elements comprises magneto-resistive elements.

5. The sensor assembly as claimed in claim 1, wherein the sensor is electrically connected to an Application Specific Integrated Circuit (ASIC).

6. A sensor assembly for a rotary sensor, comprising:
a sensor housing configured to be secured relative to a mounting environment, the sensor housing defining a cavity;
a sensor shield having a first plate and a second plate, the first plate coupled to a first side of the sensor housing and the second plate coupled to a second side of the sensor housing, wherein the sensor shield is composed of a highly permeable material; and
a sensor is disposed within the cavity of the sensor housing, the sensor comprising:
a first array of sensor elements disposed along an inner circumference of a printed circuit board in a radially outward direction, wherein the first array of sensor elements is disposed on a first side of the printed circuit board; and
a second array of sensor elements aligned along the inner circumference of the printed circuit board and disposed on the first side of the printed circuit board;
wherein at least a portion of the sensor shield is disposed between one or more of the first array of sensor elements and the second array of sensor elements and the mounting environment such that the sensor shield is configured to act as a polepiece that enables a uniform field to be provided to the sensor by isolating the one or more of the first array of sensor elements and the second array of sensor elements from a magnetic field defined by a ferrous object within the mounting environment.

7. The sensor assembly as claimed in claim 6, wherein the sensor shield is disposed within the cavity of the sensor housing.

8. The sensor assembly as claimed in claim 6, wherein the first array of sensor elements and the second array of sensor elements are electrically isolated from each other.

9. The sensor assembly as claimed in claim 6, wherein the sensor housing comprises at least one bearing, wherein the at least one bearing is positioned adjacent to the inner circumference of the printed circuit board.

10. The sensor assembly as claimed in claim 9, wherein the at least one bearing is configured to engage with a rotary shaft, wherein the rotary shaft is attached to a rotary component of a machine.

11. The sensor assembly as claimed in claim 6, wherein each array comprises a plurality of sensor elements, wherein each sensor element is placed at an equal distance from each other.

12. The sensor assembly as claimed in claim 6, wherein the sensor comprises the printed circuit board having different shapes including an arc shape, a semi-circular shape or a circular shape.

13. The sensor assembly as claimed in claim 6, wherein for each of the first array and the second array, the sensor elements are aligned on the printed circuit board defining a range of angle from about 0°-145°.

14. The sensor assembly as claimed in claim 6, wherein the sensor has a semi-circular shape and has a diameter of about 110 mm.

15. A rotary sensor for detecting a change in position of a rotary shaft, the rotary sensor comprising:
a sensor housing configured to be secured relative to a mounting environment, the sensor housing defining a cavity;
a sensor disposed within the cavity, wherein a printed circuit board comprises a plurality of sensor elements disposed along an inner circumference of the printed circuit board in a radially outward direction;
a sensor shield defining a slot along a length of the sensor shield, wherein at least a portion of the sensor shield is disposed between the plurality of sensor elements and the mounting environment such that the sensor shield is configured to act as a polepiece that enables a uniform field to be provided to the sensor by isolating the plurality of sensor elements from a magnetic field defined by a ferrous object within the mounting environment;
a bearing disposed within the cavity of the sensor housing, and positioned adjacent to the inner circumference of the printed circuit board; and
the rotary shaft, rotatable about a rotational axis, wherein the rotary shaft is engaged with the bearing, and wherein the sensor housing, the bearing, and the rotary shaft are aligned along the rotational axis.

16. The rotary sensor as claimed in claim 15, wherein the rotary shaft comprises a permanent magnet disposed on an end of the rotary shaft that is closest to the sensor.

17. The rotary sensor as claimed in claim 15 comprising a pivot pin coupled to the sensor housing along the rotational axis.

18. The rotary sensor as claimed in claim 15, wherein the sensor comprises the printed circuit board having different shapes including an arc shape, a semi-circular shape or a circular shape.

19. The rotary sensor as claimed in claim 15, wherein the sensor is electrically connected to an Application Specific Integrated Circuit (ASIC).

20. The rotary sensor as claimed in claim 15, wherein each sensor element of the plurality of sensor elements is positioned at an equal distance from each other.

* * * * *